(12) United States Patent
Cates et al.

(10) Patent No.: US 6,191,919 B1
(45) Date of Patent: Feb. 20, 2001

(54) MAGNETIC TRANSDUCER WITH DEBRIS GUIDING CHANNELS HAVING NON-VERTICAL SLOPING WALLS FORMED IN A TAPE BEARING SURFACE

(75) Inventors: James C. Cates, Louisville; Anand V. Lakshmikumaran, Northglenn, both of CO (US)

(73) Assignee: Storage Technology Corporation, Louisville, CO (US)

( * ) Notice: Under 35 U.S.C. 154(b), the term of this patent shall be extended for 0 days.

(21) Appl. No.: 09/226,329

(22) Filed: Jan. 6, 1999

(51) Int. Cl.[7] .................................................. G11B 15/60
(52) U.S. Cl. ...................... 360/130.21; 360/122; 360/221
(58) Field of Search ...................................... 360/221, 122, 360/130.21

(56) References Cited

U.S. PATENT DOCUMENTS

| | | |
|---|---|---|
| 3,398,870 | 8/1968 | Mullan et al. . |
| 5,220,473 | 6/1993 | Brock et al. . |
| 5,675,461 | 10/1997 | Aylwin et al. . |
| 5,726,841 * | 3/1998 | Tong ...................................... 360/122 |
| 5,844,749 | 12/1998 | Sakai et al. . |
| 5,850,326 | 12/1998 | Takano et al. . |
| 5,917,684 * | 6/1999 | Sato ................................. 360/130.21 |
| 5,969,912 | 10/1999 | Cope . |

FOREIGN PATENT DOCUMENTS

| | | |
|---|---|---|
| 0 452 846 A2 | 10/1991 | (EP) . |
| 57-200922 | 12/1982 | (JP) . |
| 62-008315 | 1/1987 | (JP) . |
| 10-069608 | 3/1998 | (JP) . |
| 98 39770 | 9/1998 | (WO) . |

OTHER PUBLICATIONS

IEEE Transactions On Magnetics, vol. 33, No. 5, Sep. 1997 "Recording Studies of Sub-Micron Write Heads by Focused Ion Beam Trimming" by Gorman et al.

IEEE Transactions On Magnetics, vol. 33, No. 5, Sep. 1997 "Low Fringe-Field and Narrow-Track MR Heads" by Guo et al.

IEEE Transactions On Magnetics, vol. 34, No. 4 Jul. 4, 1998 "A New Write Head Trimmed at Wafer Level by Focused Ion Beam" by Koshikawa et al.

* cited by examiner

*Primary Examiner*—A. J. Heinz
(74) *Attorney, Agent, or Firm*—Brooks & Kushman P.C.

(57) ABSTRACT

A magnetic head having a pair of longitudinal channels in a tape bearing surface that flank each transducer. The channels reduce the effective height of debris in the channels near the transducers. The channel floors may have a transverse slope, and the tape bearing surface between channels may be tapered. Transverse slots help direct debris away from the transducers. The channels overlap the end sections of the transducers and help to define the shape and position of the transducer's active section. When applied to a two pole write transducers, the channels narrow and equalize the effective width of the top and bottom poles. Narrow equal-sized poles can write narrow data tracks with a track width that is independent of the magnetic medium's direction of motion.

15 Claims, 2 Drawing Sheets

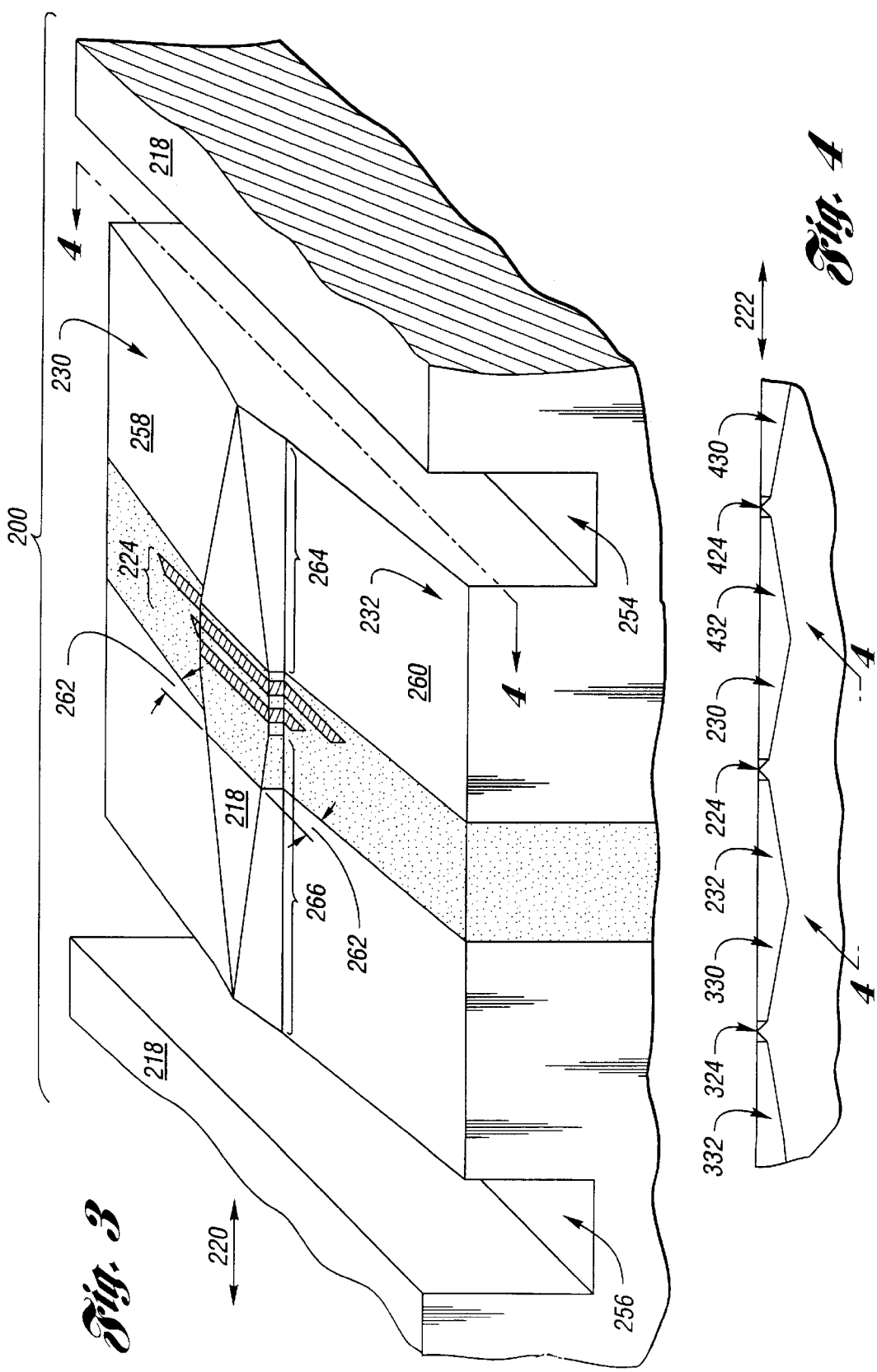

MAGNETIC TRANSDUCER WITH DEBRIS GUIDING CHANNELS HAVING NON-VERTICAL SLOPING WALLS FORMED IN A TAPE BEARING SURFACE

TECHNICAL FIELD

The present invention relates to the field of magnetic heads having longitudinal channels in the tape bearing surface.

BACKGROUND ART

The storage capacity of magnetic media can be increased by reducing the width and center-to-center spacing of the data tracks. As track densities increase beyond 1000 tracks per inch, the center-to-center spacing between tracks falls below 25.4 micrometers. Track width is determined by the shape and width of the poles of the writing transducer. The dominating factor is usually the width of the trailing pole as seen by the magnetic medium. Using current fabrication techniques, the bottom poles of write transducers are wider than the top poles. This asymmetry between the top and bottom poles cause the track widths to differ depending on the direction that the magnetic medium moves across the poles. Fabricating the top poles and bottom poles with the same width to eliminate directional track width dependencies is desirable. However, the photolithographic masks, wet etching, and/or de-plating techniques that are currently used to define the poles make this goal difficult to achieve.

"Tenting" also becomes more important as the width of the tracks decrease. Tenting occurs when debris lifts a flexible magnetic medium, such as magnetic tape, away from the tape bearing surface and the transducers. For example, a 1 micrometer debris particle 20 to 30 micrometers away from a write transducer may produce sufficient head/tape separation to cause a signal dropout during recording. Similar dropouts may occur while attempting to read in the presence of debris. Transverse slots are incorporated in some magnetic heads to remove air trapped between the media and the head, thereby keeping the head in close contact with the media. The transverse slots are found both upstream and downstream of the transducers to account for magnetic medium motion in either direction. Loose debris from the media tends to accumulate in these slots. Changes in the magnetic medium direction, excessive debris accumulated in the slots, the stop/start motion of the magnetic medium, or any other disturbance can cause debris to break loose from the slots. Debris ejected from an upstream slot may be swept across, or near the transducers potentially causing a momentary dropout.

Several groups are working to reduce the asymmetrical fringe fields caused by the asymmetrical top and bottom poles used in disk drive applications. In the articles "Recording Studies on Sub-Micron Write Heads by Focused Ion Beam Trimming", IEEE Transactions on Magnetics, Volume 33, No. 5, September 1997 by Gorman et al., and "Low Fringe-Field and Narrow-Track MR Heads", IEEE Transactions on Magnetics, Volume 33, No. 5, September 1997 by Guo et al., a focused ion beam is used to mill two channels that remove the sides of the top pole and form notches in the bottom pole. The effect of trimming the poles minimizes the side-fringing effects to minimize the erase width of the write transducers. These magnetic heads are intended for use in disk dive applications where the magnetic head sits inside a clean sealed environment and do not make contact with the magnetic disk. As a result, the channels disclosed in these articles do not address the need to minimize tenting induced by debris.

DISCLOSURE OF INVENTION

The present invention provides a magnetic head having a pair of longitudinal channels that flank each transducer in a tape bearing surface. The channels reduce the effective height of debris in the channels near the transducers. The channel floors may have a transverse slope to direct debris away from the transducers. To account for debris that appears between channels, the tape bearing surface immediately upstream and downstream of the transducers is tapered to urge the debris into a channel. Transverse slots upstream and downstream of the transducers help with debris removal. The channels extend between the two transverse slots. The channels also overlap the end sections of the transducers to help define the shape and position of the transducers' active section. When applied to a two pole write transducer, the channels narrow and equalize the effective width of the top and bottom poles. Narrow equal-sized poles can write narrow data tracks with a track width that is independent of the direction of the magnetic medium.

Accordingly, it is an object of the present invention to provide a magnetic head assembly with channels in the tape bearing surface to account for debris trapped between the magnetic head and a magnetic medium. A pair of channels in a tape bearing surface flank each transducer. Each channel is oriented parallel to the axis of motion of the magnetic medium so that debris is directed in the channels from upstream to downstream of the transducers. The depth of the channel is selected to eliminate or at least reduce the effective height of the debris that passes near the transducers.

Another object of the present invention is to provide a magnetic head assembly that can read and write narrow data tracks from a magnetic medium, and write a track width that is independent of the magnetic medium's direction of motion. The magnetic head assembly has a pair of channels flanking and partially overlapping each transducer in the tape bearing surface. Formation of the channels allows the shape and position of the active section of the transducers to be established accurately.

These and other objects, features and advantages will be readily apparent upon consideration of the following detailed description in conjunction with the accompanying drawings.

BRIEF DESCRIPTION OF DRAWINGS

FIG. 3 is a partial perspective view of a tape bearing surface of a magnetic head having a write transducer flanked by two channels that have sloping floors, where the channels extend between two transverse slots, and where the tape bearing surface between the channels is tapered; and FIG. 4 is a cross-sectional view of the magnetic head taken along line 4—4 from FIG. 3, including the neighboring transducers and channels.

BEST MODE FOR CARRYING OUT THE INVENTION

Figure 1:
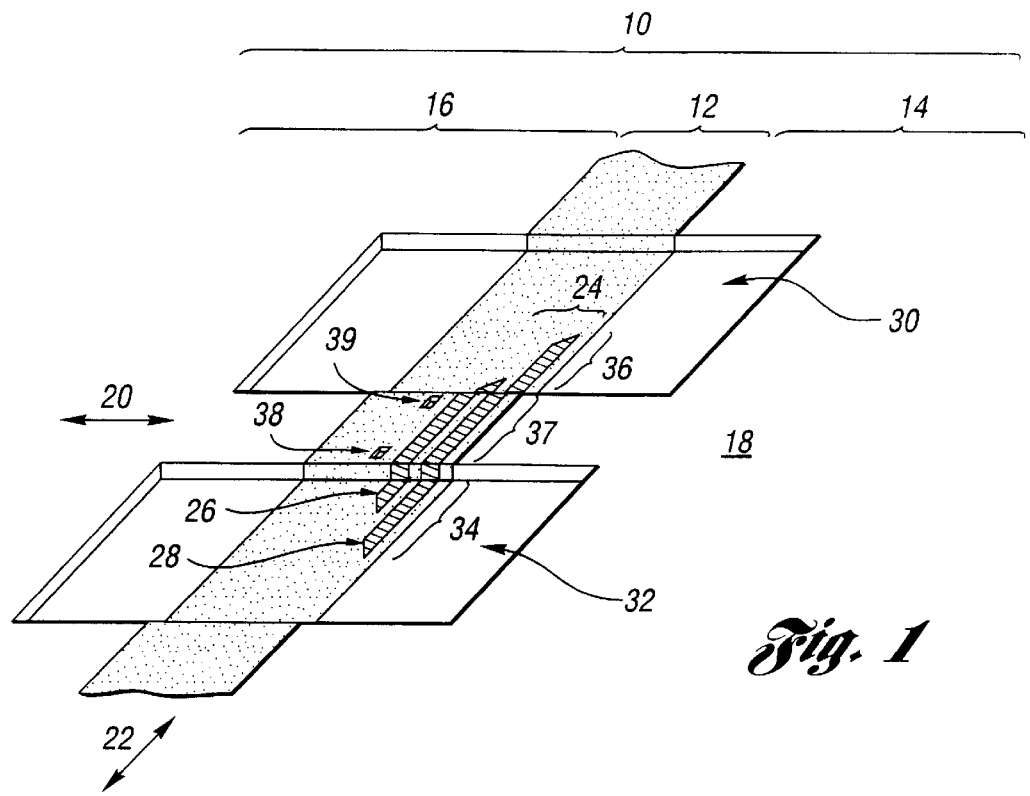
FIG. 1 is a partial perspective view of a tape bearing surface of a magnetic head having a write transducer flanked by two channels.

FIG. 1 shows the three general sections that comprise a magnetic head 10, a thin film region 12 surrounded by a substrate 14 and a closure 16. The sum of these three sections forms a tape bearing surface 18 which a magnetic medium (not shown) moves across in close proximity. Relative motion between the magnetic medium and the tape bearing surface 18 is in either direction along a longitudinal axis, shown as axis 20. The width of the magnetic head 10 is parallel to a transverse axis, shown as axis 22. Transverse axis 22 is perpendicular to longitudinal axis 20.

Thin film region 12 contains one or more transducers. FIG. 1 shows a single write transducer 24 comprising a top pole 26 and a bottom pole 28. Other write transducer configurations are possible within the scope of the present invention. A pair of channels 30 and 32 flank the transducer 24. Channels 30 and 32 are oriented parallel to the longitudinal axis 20 so that debris is directed in the channels 30 and 32 from upstream to downstream of the transducer 24. Typical minimum dimensions of each channel 30 and 32 are 10 micrometers in width as measured along the transverse axis 22, and 10 micrometers in length as measured along the longitudinal axis 20. Along the longitudinal axis 20, channels 30 and 32 are approximately centered about transducer 24. The channel dimensions may be larger or smaller depending upon the size of the anticipated debris. Channels 30 and 32 have a depth of at least 0.5 micrometers. This depth is sufficient to eliminate tenting caused by debris 0.5 micrometers or smaller passing through channels 30 and 32. In the preferred embodiment, the depth is approximately 2 micrometers to handle larger debris encountered in tape drive applications.

Channels 30 and 32 may be formed using standard wet or dry etching techniques. Precession etching techniques, such as a focused ion beam, are preferred. A focused ion beam can determine the position and shape of channels 30 and 32 to an accuracy of approximately 0.5 micrometers. Channels 30 and 32 may be formed such that transducer 24 resides completely between them (not shown in FIG. 1). In the preferred embodiment, channels 30 and 32 overlap end sections 34 and 36 of poles 26 and 28. This overlap defines the position and shape of center section 37 of poles 26 and 28. Since end sections 34 and 36 are recessed at least 0.5 micrometers below the tape bearing surface 18, data written to the magnetic medium is determined only by the shape of the center section 37. In practice, the center section 37 of top pole 26 and bottom pole 28 have the same width, which typically ranges from 5 to 20 micrometers. By making the top pole 26 the same width as the bottom pole 28, the width of the data track that they write is independent of the magnetic medium's direction of motion.

Control of the track-to-track centerline pitch in multi-track write heads is also required to achieve high track densities on the magnetic medium. Using a conventional wet etching process to define poles 26 and 28, variations in the thickness of the pole material and undercutting of the photo resist can produce track-to-track centerline errors as large as ±2 micrometers. This track-to-track centerline error remains when the poles 26 and 28 themselves are used as alignment references for patterning the channels 30 and 32. The present invention's solution to this problem is the addition of fiducials 38 and 39 near poles 26 and 28. These small fiducials 38 and 39 are photolithographically patterned and defined by a precise process, such as ion milling, before channels 30 and 32 are formed. Center-to-center spacing between each pair of fiducial 38 and 39 is determined by the photolithographic pattern, not by the poles 26 and 28. Fiducials 38 and 39 are milled to a depth of only around 0.2 micrometers to help preserve their accuracy. Fiducials 38 and 39 can be recognized by the focused ion beam software as reference points from which the positions of channels 30 and 32 can be determined. This allows the width and position of center section 37 of poles 26 and 28 to be defined very accurately. Such a technique leads to tightening the track-to-track centerline tolerance to better than ±0.2 micrometers.

Figure 2:
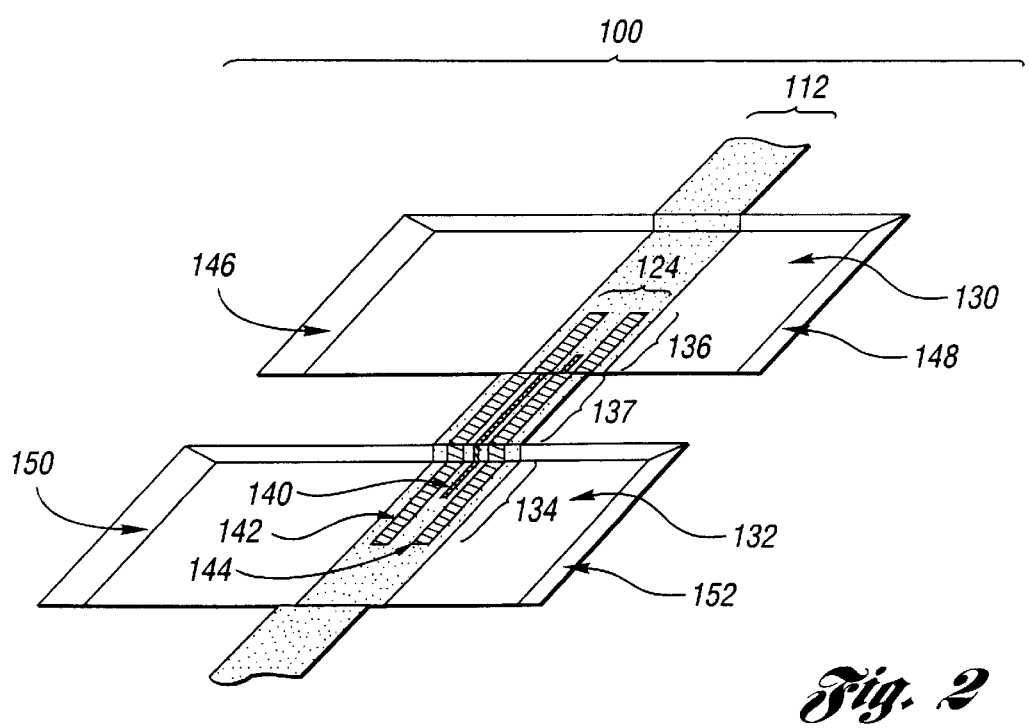
FIG. 2 is a partial perspective view of a tape bearing surface of a magnetic head having a read transducer flanked by two channels that have sloping transverse sides.

FIG. 2 shows another embodiment of a magnetic head 100 where one or more read transducers 124 are formed in the thin film region 112. One read transducer 124 comprises a magneto-resistive element 140 between shields 142 and 144. Other read transducer configurations are possible within the scope of the present invention. As with the write transducer in FIG. 1, a pair of channels 130 and 132 flank the read transducer 124. The size and depth of channels 130 and 132 are the same as channels 30 and 32 in FIG. 1. In FIG. 2, channels 130 and 132 are also shown having sloping sides 146, 148, 150 and 152. These slopes may be added to help prevent debris from accumulating in the channels 130 and 132. The sloping sides may also be used with write transducers, for example the write transducer 24 shown in FIG. 1, and with combinations of read and write transducers.

As with the write transducers, channels 130 and 132 may be fabricated such that the read transducer 124 resides completely between them (not shown in FIG. 2). In the preferred embodiment, channels 130 and 132 overlap the end sections 134 and 136 of the magneto-resistive element 140 and shields 142 and 144. This overlap defines the shape and position of center section 137 of the read transducer 124. Narrowing the center section 137 of the magneto-resistive element 140 allows the effective width of the read transducer 124 to be controlled to the same accuracy as is the width of the write transducer 24 from FIG. 1.

FIG. 3 shows another embodiment of a magnetic head 200. Channels 230 and 232 extend between two transverse slots 254 and 256. Any debris that reaches channels 230 and 232 is directed downstream to transverse slot 254 or transverse slot 256, depending on the magnetic medium's direction of motion. Also, some of the air trapped between the magnetic medium (not shown) and the tape bearing surface 218 flows into channels 230 and 232, then out through transverse slots 254 and 256. Bleeding off some air allows for more intimate transducer/medium contact. To aid in directing debris away from the transducer 224, floors 258 and 260 of channels 230 and 232 respectively slope away from the tape bearing surface 218 at an angle 262. Angle 262 is measured in a plane normal to the longitudinal axis, shown as axis 220, from near transducer 224. The preferred angle 262 is approximately 20 degrees. Larger and smaller angles may be used in other embodiments depending upon the anticipated size of the debris and the center-to-center spacing between transducers. To aid in debris control further, portions 264 and 266 of the tape bearing surface 218 are tapered along longitudinal axis 220. The widths of the tapers are a maximum distance near transducer 224 and a minimum distance at transverse slots 254 and 256 respectively. Any debris approaching transducer 224 along a path that runs between channels 230 and 232 is deflected by the tapers into channels 230 or 232.

FIG. 4 shows the cross-section of the magnetic head 200 taken along line 4—4 from FIG. 3. FIG. 4 includes the neighboring transducers 324 and 424 and associated channels 330, 332, 430 and 432 respectively. In the preferred embodiment, adjacent channels between adjacent transducers, for example channel 232 and channel 330, are contiguous along the transverse axis, shown as axis 222. Any debris that appears between transducers 324 and 224 is biased by the slopes of channels 232 and 330 towards the halfway point between the transducers 324 and 224 until it is swept into one of the transverse slots 254 or 256.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A magnetic head assembly for use with a magnetic medium, the magnetic head assembly comprising:
   a tape bearing surface having a longitudinal axis, and a transverse axis perpendicular to the longitudinal axis, and wherein the magnetic medium moves in a direction parallel to the longitudinal axis;
   at least one transducer disposed in the tape bearing surface; and
   at least one pair of channels in the tape bearing surface, wherein each pair of channels respectively flank each transducer of the at least one transducer, each channel of the at least one pair of channels is oriented parallel to the longitudinal axis of the tape bearing surface, each channel has a floor disposed below the tape bearing surface, and each channel has two sloping sides that are parallel to the transverse axis and form a greater than 104 degree angle from the floor to help prevent debris from accumulating in the at least one pair of channels.

2. The magnetic head assembly of claim 1 wherein the at least one transducer has two end sections that extend into the respective pair of channels, and the two end sections are approximately flush with the floors of each channel respectively.

3. The magnetic head assembly of claim 2 wherein the at least one transducer has a contiguous center section disposed between the two end sections, and wherein the center section has a width ranging from 5 to 20 micrometers.

4. The magnetic head assembly of claim 1 wherein each channel of the at least one pair of channels has a longitudinal length of at least 10 micrometers, and a transverse width of at least 10 micrometers.

5. The magnetic head assembly of claim 1 further comprising:
   two transverse slots in the tape bearing surface parallel to the transverse axis, the two transverse slots flank the at least one pair of channels; and
   wherein each channel also extends between the two transverse slots.

6. The magnetic head assembly of claim 5 wherein the tape bearing surface between the two channels of the at least one pair of channels is tapered in each direction along the longitudinal axis from a maximum distance adjacent to the respective transducer, to a minimum distance adjacent the two transverse slots.

7. The magnetic head assembly of claim 1 wherein each floor slopes away from the tape bearing surface at a predetermined angle greater than zero degrees with respect to the tape bearing surface, the predetermined angle being measured in a plane normal to the longitudinal axis.

8. The magnetic head assembly of claim 7 wherein the angle is approximately 20 degrees.

9. The magnetic head assembly of claim 1 wherein the at least one transducer is a plurality of transducers disposed along the transverse axis of the tape bearing surface.

10. The magnetic head assembly of claim 9 wherein adjacent channels associated with adjacent transducers are contiguous.

11. The magnetic head assembly of claim 9 further comprising at least one pair of fiducials in the tape bearing surface, wherein each pair of fiducials of the at least one pair of fiducials is disposed adjacent the at least one transducer respectively.

12. The magnetic head assembly of claim 1 wherein each channel has a depth of at least 0.5 micrometers adjacent the respective transducer.

13. The magnetic head assembly of claim 12 wherein the depth is approximately 2 micrometers.

14. The magnetic head assembly of claim 1 wherein the at least one transducer is a write transducer.

15. The magnetic head assembly of claim 1 wherein the at least one transducer is a read transducer.

* * * * *